United States Patent [19]

Ueno et al.

[11] Patent Number: 4,871,910
[45] Date of Patent: Oct. 3, 1989

[54] METHOD AND APPARATUS FOR MEASURING THE SIZE OF WIRE ROD WITH LASER BEAM AND REFERENCE ROD

[75] Inventors: Toru Ueno; Youichi Fukuoka, both of Hadano; Seiichi Baba, Kamakura; Kaoru Miyoshi, Yokohama; Kazuto Kinoshita, Tsukuba, all of Japan

[73] Assignee: Hitachi, Ltd., Tokyo, Japan

[21] Appl. No.: 223,097

[22] Filed: Jul. 22, 1988

[30] Foreign Application Priority Data

Jul. 24, 1987 [JP] Japan ................................ 62-183720

[51] Int. Cl.$^4$ ......................... G01N 21/86; G01V 9/04
[52] U.S. Cl. ..................................... 250/560; 356/386
[58] Field of Search ................ 250/560, 561; 356/384, 356/385, 386, 387

[56] References Cited

U.S. PATENT DOCUMENTS 4,732,486 3/1988 Rinn ..................................... 356/386
4,778,271 10/1988 Kuwabara et al. .................. 250/560

OTHER PUBLICATIONS

"Illustrations of Applications of Laser Beams", in Electronics Review, Jan. Jul. 1980.

*Primary Examiner*—David C. Nelms
*Assistant Examiner*—Eric F. Chatmon
*Attorney, Agent, or Firm*—Fay, Sharpe, Beall, Fagan, Minnich & McKee

[57] ABSTRACT

A method for measuring the size of a wire rod comprises the steps of turning a laser beam from a laser beam source into a parallel beam used for scanning, disposing a first wire rod having an unknown size and a second wire rod having an already known size larger than the diameter of the spot of the laser beam adjacent to each other in a direction of scanning with the laser beam, receiving the laser beam traversed the first and second wire rods thereby generating a corresponding electrical output signal, and calculating the size of the first wire rod on the basis of the electrical output signal.

6 Claims, 3 Drawing Sheets

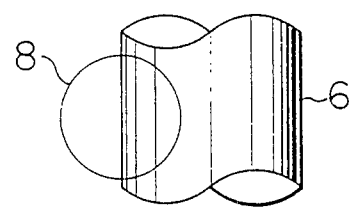
F I G. 1(A)
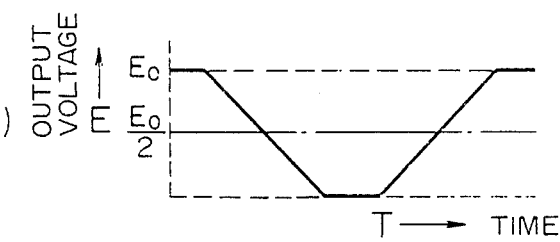
F I G. 1(B)
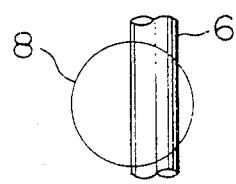
F I G. 2(A)
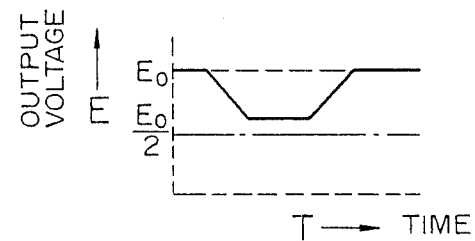
F I G. 2(B)

FIG. 3
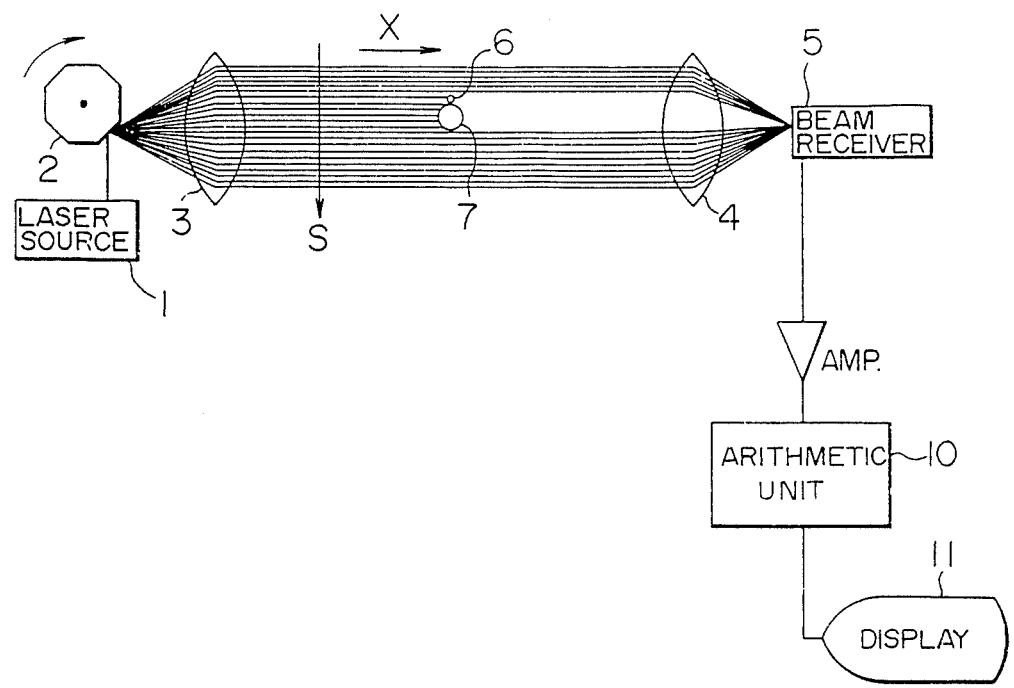
FIG. 4(A)
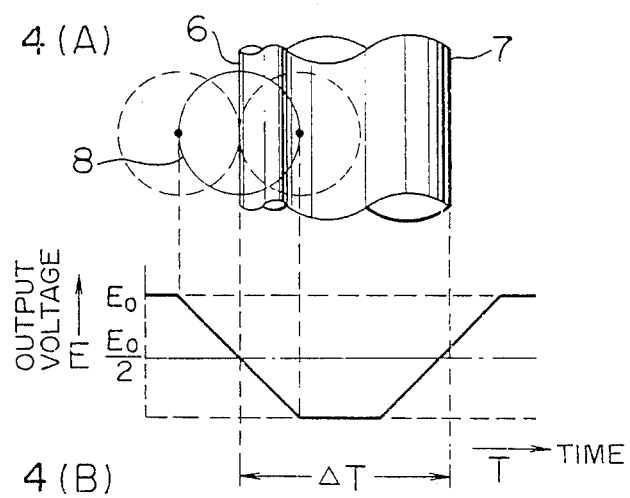
FIG. 4(B)

METHOD AND APPARATUS FOR MEASURING THE SIZE OF WIRE ROD WITH LASER BEAM AND REFERENCE ROD

BACKGROUND OF THE INVENTION

This invention relates to a method and apparatus for measuring the size of a wire rod with a laser beam without making any contact with the wire rod. More particularly, this invention relates to a method and apparatus of the kind described above which can measure the size of a pin or the like having an outer diameter smaller than the diameter of a laser beam spot.

Methods for measuring the size (the outer diameter) of a pin, a wire rod or the like by the use of a laser beam are disclosed in, for example, "Illustrations of Applications of Laser Beams" described in "Electronics Review, January-July Number, 1980".

According to one of the prior art methods disclosed in this paper, an object such as a pin or a wire rod is scanned with a parallel laser beam, and the period of interception of the laser beam by the object is measured so as to calculate the size (the outer diameter) of the object. According to another method disclosed in the paper, a laser beam not scanning such an object is directed toward the object, and the distance between bright spots formed on a screen by the diffraction of the laser beam is measured so as to calculate the size (the outer diameter) of the object.

The former prior art method disclosed in the paper for measuring the outer diameter of a wire rod by scanning with a laser beam will be described in detail with reference to FIGS. 1(A), 1(B) and FIGS. 2(A), 2(B), so that the present invention can be more clearly understood.

FIGS. 1(A), 1(B) and FIGS. 2(A), 2(B) show the relation between a laser beam spot 8 and a pin 6 whose outer diameter is unknown and to be measured and show also the relation between time and an output voltage of a beam receiving element when the outer diameter of the pin 6 to be measured is larger and smaller than the diameter of the laser beam spot 8 respectively.

Referring to FIGS. 1(B) and 2(A), the laser beam spot 8 is controlled to traverse at a predetermined speed from, for example, the left-hand side toward the right-hand side in FIG. 1(A) by means (now shown) so as to scan the pin 6. A beam receiving element (not shown) is located behind the pin 6 through an interposed optical system (not shown) to receive the laser beam spot 8 during scanning. When the laser beam spot 8 being traversed for scanning is intercepted by the pin 6, the output voltage of the beam receiving element decreases, and, when the laser beam spot 8 moves away from the pin 6, the output voltage of the beam receiving element increases. As a result, when the outer diameter of the pin 6 is larger than the diameter of the laser beam spot 8, the output voltage E of the beam receiving element decreases progressively with lapse of time of scanning with the laser beam spot 8 until the output voltage E drops to its "O" potential level as shown in FIG. 1(B), because the laser beam spot 8 is entirely intercepted by the pin 6. Then, the output voltage E of the beam receiving element increases progressively. Therefore, by measuring the period of time during which the output voltage E of the beam receiving element is lower than a specific value, for example, $\frac{1}{2}$ of its highest level $E_0$, the outer diameter of the pin 6 can be calculated on the basis of the measured period of time.

On the other hand, when the outer diameter of the pin 6 to be measured is smaller than the diameter of the laser beam spot 8, the entirety of the laser beam spot 8 is not intercepted by the pin 6. Therefore, the output voltage E of the beam receiving element does not decrease to a level lower than a certain level. That is, the output voltage E will not decrease to a level lower than the aforementioned specific voltage $E_0/2$ as shown in FIG. 2(B). In such a case, the outer diameter of the pin 6 cannot be measured.

As discussed above, in the prior art method for measuring the outer diameter of a pin by scanning with a laser beam spot, the outer diameter of the pin can be measured within an allowable measurable range of an optical system used for measurement when the outer diameter of the pin is larger than the diameter of the laser beam spot. However, it has been unable to measure the outer diameter of the pin when the outer diameter of the pin is smaller than the diameter of the laser beam spot. Also, it has been unable to measure the outer diameter of the pin with satisfactory accuracy even when the level of the specific voltage to be compared with the output voltage of the beam receiving element is selected to permit measurement of the outer diameter of the pin.

SUMMARY OF THE INVENTION

It is an object of the present invention to provide a method and apparatus that can measure the size (the outer diameter) of a wire rod with high accuracy by scanning with a laser beam spot and that is able to measure a wide range of wire rod from wire rod having a large size to that having a very small size which could not be measured by the prior art method.

According to the present invention which attains the above object, a first pin whose outer diameter is unknown and to be measured and a second pin whose outer diameter is already known and larger than the diameter of a laser beam spot are disposed closely adjacent to each other in the same direction as the scanning direction of the laser beam spot.

When the second pin, whose outer diameter is already known and larger than the diameter of the laser beam spot, is disposed closely adjacent to the first pin, whose outer diameter is unknown and to be measured, in the same direction as the scanning direction of the laser beam spot, the value of the actually measured outer diameter is the sum of the outer diameter of the second pin and that of the first pin. The outer diameter of the second pin is larger than the diameter of the laser beam spot. Therefore, regardless of the value of the outer diameter of the first pin, the sum of the outer diameter of the second pin and that of the first pin is necessarily larger than the value of the diameter of the laser beam spot, and the measured value of the sum is highly accurate. Therefore, when the value of the known outer diameter of the second pin is subtracted from the measured value of the sum, the unknown outer diameter of the first pin can be calculated with high accuracy.

BRIEF DESCRIPTION OF THE DRAWINGS

FIGS. 1(A), 1(B) and FIGS. 2(A), 2(B) show the relation between the size (the outer diameter) of a wire rod and the diameter of a laser beam spot and also show graphically an output voltage of a beam receiving element, respectively to illustrate a prior art method used for measuring the size (the outer diameter) of the wire rod.

FIG. 3 is a diagrammatic view showing an optical system arrangement employed in an embodiment of the present invention.

FIGS. 4(A) and 4(B) show the relation between the size (the outer diameter) of a wire rod and the diameter of a laser beam spot and also show graphically an output voltage of a beam receiving element respectively in the embodiment of the present invention shown in FIG. 3.

DESCRIPTION OF THE PREFERRED EMBODIMENTS

Figure 5A:
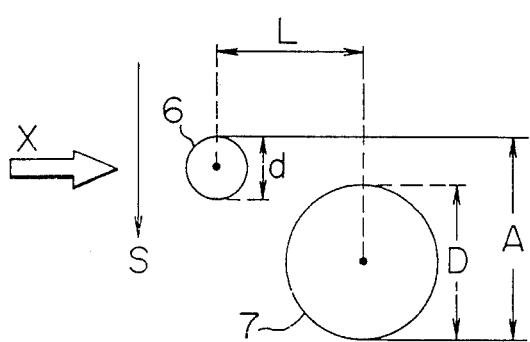
FIGS. 5(A) and 5(B) show diagrammatically another embodiment of the method of measuring the size (the outer diameter) of a wire rod according to the present invention.

Preferred embodiments of the method of the present invention for measuring the outer diameter of, for example, a pin by scanning with a laser beam will now be described in detail with reference to the drawings.

FIG. 3 illustrates an embodiment of the method according to the present invention. FIG. 4(A) shows the relation between a laser beam spot, a first pin whose outer diameter is unknown and to be measured and an adjacent second pin whose outer diameter is already known and larger than the diameter of the laser beam spot. FIG. 4(B) shows the relation between time and an output voltage of a beam receiving element.

As diagrammatically shown in FIG. 3, an apparatus used for putting into practice an embodiment of the method of measurement according to the present invention comprises a laser beam source 1, a rotary mirror 2 rotating in a direction as shown by the arrow, a beam projecting convex lens 3, a beam condensing convex lens 4, and a beam receiving element 5 such as a CCD. A first pin 6 whose outer diameter is unknown and to be measured and a second pin 7 whose outer diameter is already known and larger than the diameter of a laser beam spot 8 are disposed in contact with each other in the same direction as the scanning direction S of the laser beam spot 8. The beam receiving element 5 is connected at its output to an arithmetic processing unit 10 through an amplifier, and the arithmetic processing unit 10 is connected to a display unit 11.

In the apparatus having such a structure, the laser beam spot 8 emitted from the laser beam source 1 is reflected by the rotary mirror 2 to be guided toward the beam projecting convex lens 3, and, with the rotation of the rotary mirror 2, moves along a path which passes the center of the beam projecting convex lens 3 from the periphery of the lens 3. The laser beam spot 8 passed through the beam projecting convex lens 3 makes a parallel movement between the beam projecting convex lens 3 and the beam condensing convex lens 4 to be received by the beam receiving element 5 after passing through the beam condensing convex lens 4. The first pin 6 whose outer diameter is unknown and the second pin 7 whose outer diameter is already known are disposed closely adjacent to each other between the two convex lenses 3 and 4 in the same direction as the scanning direction of the laser beam spot 8. Therefore, when the scanning laser beam spot 8 traverses the disposed positions of the first and second pins 6 and 7, the laser beam spot 8 is intercepted by these pins 6 and 7. In this case, the moving speed of the laser beam spot 8 moving between the beam projecting convex lens 3 and the beam condensing convex lens 4 is fixed, and the laser beam spot 8 scans the first and second pins 6 and 7 from the left-hand side toward the right-hand side in FIG. 4(A).

FIG. 4(B) shows the output voltage E of the beam receiving element 5 receiving the laser beam spot 8 making such a scanning action. Because the outer diameter of the second pin 7 is larger than the diameter of the laser beam spot 8, the output voltage E of the beam receiving element 5 drops necessarily to its "0" potential level as show in FIG. 4(B). That is, the output voltage E of the beam receiving element 5 drops necessarily to a level lower than a threshold level which is ½ of its maximum output voltage $E_0$. Therefore, the value of the sum of the outer diameters of the first and second pins 6 and 7 can be measured when the period of time during which the output voltage E of the beam receiving element 5 is lower than the threshold level of $E_0/2$ is calculated by the arithmetic processing unit 10. Then, when the value of the known outer diameter of the second pin 7 is subtracted by the arithmetic processing unit 10 from the measured value of the sum of the outer diameters, the unknown outer diameter of the first pin 6 can be calculated. Thus, according to the embodiment of the present invention, the outer diameter of the first pin 6 can be measured even when it is smaller than the diameter of the laser beam spot 8. Further, according to the embodiment described above, the unknown outer diameter of the first pin 6 can also be measured without the use of the second pin 7 in a manner similar to the prior art method shown in FIG. 1, when it is larger than the diameter of the laser beam spot 8. In this case, the measurable limit of the outer diameter of the pin 6 is almost the same as that of the diameter of the beam projecting and condensing convex lenses 3 and 4. The output of the arithmetic processing unit 10 is applied to the display unit 11 such as a cathode-ray tube to display the outer diameter of the first pin 6 on the display unit 11. The arithmetic processing unit 10 may be an electronic computer or any other suitable arithmetic circuit.

In the first embodiment described above, the first pin 6 whose outer diameter is unknown is disposed closely adjacent to the second pin 7 whose outer diameter has been previously accurately measured.

Figure 5B:
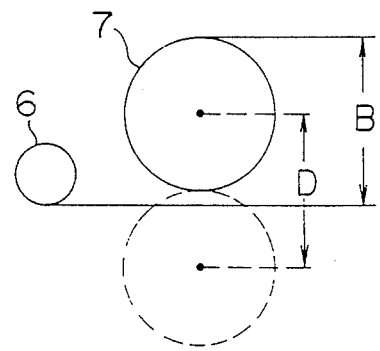

Another embodiment which is a modification of the first embodiment is shown in FIGS. 5(A) and 5(B) in which the first wire rod on pin 6 and the second wire rod on pin 7 are spaced apart from each other in the advancing direction X of the laser beam spot. In FIG. 5(A), these pins 6 and 7 are spaced apart by a center-to-center distance L from each other.

In such a pin arrangement, the unknown outer diameter d of the first pin 6 is measured on the basis of the known outer diameter D of the second pin 7 by a method which will be described below.

First, as shown in FIG. 5(A), the first pin 6 and the second pin 7 are disposed in a relation in which they partly overlap with each other in the scanning direction S substantially orthogonal with respect to the advancing direction X of the laser beam spot, and a dimension A in such a pin arrangement is measured. This dimension A can be calculated by multiplying the scanning speed of the laser beam spot by the period $\Delta T$ in which the level of the output voltage E of the beam receiving element is $E_0/2$ as shown in FIG. 4(B). Then, as shown in FIG. 5(B), a dimension B is measured after displacing the second pin 7 only by the same distance as the outer diameter D of the pin 7 in a direction opposite to the scanning direction S. On the basis of the measured values of A and B, the unknown outer diameter d of the first pin 6 is calculated according to the following calculating formula:

$$d = A + B - 2D$$

The aforementioned embodiments have referred to measurement of the outer diameter of a single wire rod having a circular sectional shape. However, it is apparent that the present invention is equally effectively applicable to a wire rod having a rectangular sectional shape.

Figure 6:
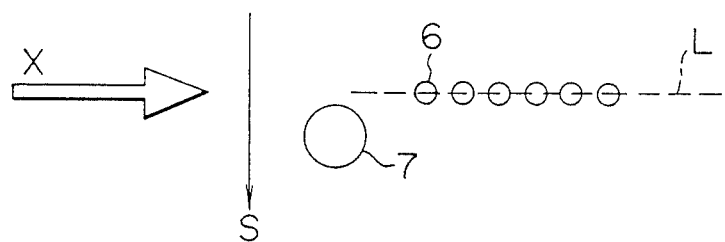
FIG. 6 shows diagrammatically still another embodiment of the present invention applied to measurement of the size (the outer diameter) of a plurality of wire rods whose outer diameter is unknown.

Further, the present invention is also effectively applicable to an array of a plurality of pins such as those upstanding from pin grid array sockets and IC sockets. That is, when a plurality of pins 6 are arrayed on a socket as shown in FIG. 6 (in which six pins are shown), not only the outer diameter of the pins 6 can be measured, but also, whether or not these pins 6 are accurately aligned on a line L can be detected. If bending of anyone of the six pins upstanding from the socket is detected, the socket is rejected.

In the embodiment of the present invention shown in FIG. 3, the rotary mirror and two convex lenses are used as the optical systems for scanning with the laser beam spot. However, the present invention includes also a modification in which these two convex lenses forming the optical systems are replaced by two parabolic mirrors.

It will be understood from the foregoing detailed description that, according to the method and apparatus of the present invention using a laser beam for scanning, a wide range of outer diameters of pins ranging from a large outer diameter which is an allowable measurable limit of an optical system to a very small outer diameter smaller than the diameter of the laser beam spot can be measured with high accuracy without any measuring contact with the pins.

We claim:

1. An apparatus for measuring the size of a wire rod comprising:
    a laser beam source;
    a scanning optical system for directing a laser beam emitted from said laser beam source toward a first wire rod having an unknown size, so as to scan said first wire rod;
    an optical system for turning the laser beam from said scanning optical system into a parallel beam;
    a condensing optical system for condensing the parallel beam after the parallel beam traverses said first wire rod;
    a beam receiving element for receiving the laser beam from said condensing optical system thereby generating a corresponding electrical output signal;
    a second wire rod disposed adjacent to said first wire rod in a direction of scanning with the laser beam, said second wire rod having an already known size larger than the diameter of the spot of the laser beam; and
    means for calculating the size of said first wire rod on the basis of the electrical output signal of said beam receiving element.

2. An apparatus according to claim 1, wherein said first wire rod and said second wire rod are disposed in contact with each other in said scanning direction.

3. An apparatus according to claim 1, wherein said first wire rod and said second wire rod are spaced apart from each other in a direction substantially orthogonal with respect to said scanning direction.

4. A method for measuring the size of a wire rod comprising the steps of:
    turning a laser beam from a laser beam source into a parallel beam used for scanning;
    disposing a first wire rod having an unknown size and a second wire rod having an already known size larger than the diameter of the spot of the laser beam adjacent to each other in a direction of scanning with the laser beam;
    receiving the parallel beam after the parallel beam traverses said first and second wire rods thereby generating a corresponding electrical output signal; and
    calculating the size of said first wire rod on the basis of said electrical output signal.

5. A method according to claim 4, wherein said first wire rod and said second wire rod are disposed in contact with each other in said scanning direction.

6. A method according to claim 4, wherein said first wire rod and said second wire rod are spaced apart from each other in a direction substantially orthogonal with respect to said scanning direction.

* * * * *